US011593206B2

(12) United States Patent
Kamran et al.

(10) Patent No.: US 11,593,206 B2
(45) Date of Patent: Feb. 28, 2023

(54) DISTRIBUTED RAID REBUILD

(71) Applicant: EMC IP Holding Company LLC, Hopkinton, MA (US)

(72) Inventors: Lior Kamran, Richon LeZion (IL); Amitai Alkalay, Kadima (IL)

(73) Assignee: EMC IP Holding Company LLC, Hopkinton, MA (US)

(*) Notice: Subject to any disclaimer, the term of this patent is extended or adjusted under 35 U.S.C. 154(b) by 66 days.

(21) Appl. No.: 17/152,270

(22) Filed: Jan. 19, 2021

(65) Prior Publication Data

US 2022/0229729 A1 Jul. 21, 2022

(51) Int. Cl.
*G06F 11/10* (2006.01)
*G06F 11/07* (2006.01)
*G06F 11/30* (2006.01)
*G06F 3/06* (2006.01)
*G06F 15/173* (2006.01)

(52) U.S. Cl.
CPC ........ *G06F 11/1092* (2013.01); *G06F 3/0619* (2013.01); *G06F 3/0629* (2013.01); *G06F 3/0659* (2013.01); *G06F 3/0689* (2013.01); *G06F 11/0787* (2013.01); *G06F 11/3034* (2013.01); *G06F 15/17331* (2013.01)

(58) Field of Classification Search
CPC ............. G06F 11/1092; G06F 11/0787; G06F 11/0727; G06F 11/3034; G06F 3/0619; G06F 3/0629; G06F 3/0689; G06F 15/17331

See application file for complete search history.

(56) References Cited

U.S. PATENT DOCUMENTS

| 10,095,585 | B1 | 10/2018 | Proulx |
| 10,210,045 | B1 | 2/2019 | Gao et al. |
| 11,221,917 | B1* | 1/2022 | Dhuse ................. G06F 11/1092 |
| 2012/0331065 | A1* | 12/2012 | Aho ...................... G06F 15/167 709/206 |
| 2014/0195847 | A1* | 7/2014 | Webman ................. G06F 3/067 714/6.22 |
| 2017/0097875 | A1* | 4/2017 | Jess ...................... G06F 11/1088 |
| 2019/0196908 | A1* | 6/2019 | Chiba ....................... G06F 3/06 |
| 2020/0065191 | A1* | 2/2020 | Zhou .................. G06F 11/1662 |
| 2020/0133503 | A1 | 4/2020 | Sun et al. |
| 2020/0133811 | A1 | 4/2020 | Gao et al. |

(Continued)

OTHER PUBLICATIONS

Zhuo, Baote, et al.; "Method, Device, and Program Product for Selecting Rebuild Destination in Storage System," U.S. Appl. No. 16/936,710, filed Jul. 23, 2020.

*Primary Examiner* — Yolanda L Wilson
(74) *Attorney, Agent, or Firm* — BainwoodHuang

(57) ABSTRACT

A technique is disclosed for generating rebuild data of a RAID configuration having one or more failed drives. The RAID configuration includes multiple sets of drives coupled to respective computing nodes, and the computing nodes are coupled together via a network. A lead node directs rebuild activities, communicating with the other node or nodes and directing such node(s) to compute partial rebuild results. The partial rebuild results are based on data of the drives of the RAID configuration coupled to the other node(s). The lead node receives the partial rebuild results over the network and computes complete rebuild data based at least in part on the partial rebuild results.

18 Claims, 3 Drawing Sheets

(56) References Cited

U.S. PATENT DOCUMENTS

2020/0218617 A1\* 7/2020 Knestele ............... G06F 9/5027
2020/0349007 A1 11/2020 Armangau et al.
2021/0279137 A1\* 9/2021 Patel ................... G06F 11/1092

\* cited by examiner

DISTRIBUTED RAID REBUILD

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Many data storage systems use RAID technology to protect data from disk drive failures. RAID is an acronym for Redundant Array of Independent Disks and can be realized in a variety of implementations. Some RAID arrangements use mirroring to maintain multiple copies of the same data on different drives. If one drive fails, another drive can be accessed to retrieve the data. Other RAID arrangements use parity, where parity data provide redundancy for multiple corresponding regions of respective drives. If a drive fails, the contents of that drive can be recovered by performing a computation based on data in the corresponding regions of the remaining drives and the parity data. Some parity-protection schemes use single parity (e.g., RAID-4 and RAID-5), whereas others use double parity (e.g., RAID-6). With single parity, a single failed drive can be recovered by computing the bitwise XOR (exclusive-OR) of the corresponding data on the other drives and the parity data. Failure of a second drive will result in data loss. Double parity schemes use two independent types of parity data and can thus suffer the failure of two disk drives without data loss. These parity types include XOR-based parity data, as used in single-parity schemes, as well as an additional type of parity known as Reed-Solomon parity. Single-parity schemes can be realized with as few as three disk drives, and double-parity schemes with as few as four. There is no hard limit on the maximum numbers of drives, although larger arrays run a greater risk of multiple drive failures.

SUMMARY

Typical RAID configurations are managed by RAID controllers, which may form parts of computers, such as storage processors, also referred to herein as "nodes." The RAID controllers keep track of how data is distributed across the various disk drives. They also operate protocols for expressing RAID configurations as logical disks. For example, a RAID configuration consisting of 8 disk drives might appear to clients of a RAID controller as a single drive, e.g., one whose data is addressable using LBA (logical block addressing). The RAID controller also manages data recovery tasks in the event of a drive failure, ideally in a way that is invisible to clients. If one or more drives of a RAID configuration fail, the RAID controller uses RAID protocols to rebuild the contents of the failed drive on a spare drive or, in the case of mapped RAID, on multiple spare portions of other drives.

Unfortunately, the above-described prior RAID methodologies require RAID rebuild by a single entity. If a disk drive fails, prompting recovery operations, a single node on which the RAID controller runs must do all of the processing needed to compute the rebuild data of the failed drive. The requirement for single-node rebuild computations means that any drives of the RAID configuration connected to the node over a network will need to send considerable amounts of data back to the node over that network, in order for the RAID controller to gather all the inputs it requires to compute the rebuild data. Some networks lack the bandwidth needed to support transmission of such large amounts of data within a reasonable amount of time. These limitations can result in excessively long rebuild times, which may be unacceptable, given that the probability of multiple disk drive failures increases with longer rebuild times, increasing the risk of data loss. Some networks may have enough bandwidth to barely meet rebuild time requirements, but only by starving out other important network traffic, such as drive I/O (input/output) for supporting normal reads and writes, i.e., primary functions of a data storage system. What is needed is a more efficient approach to RAID rebuild, which places lesser bandwidth demands on networks.

This need is addressed at least in part by an improved technique for generating rebuild data of a RAID configuration having one or more failed drives. The RAID configuration includes multiple sets of drives coupled to respective computing nodes, and the computing nodes are coupled together via a network. A lead node directs rebuild activities, communicating with the other node or nodes and directing such node(s) to compute partial rebuild results. The partial rebuild results are based on data of the drives of the RAID configuration coupled to the other node(s). The lead node receives the partial rebuild results over the network and computes complete rebuild data based at least in part on the partial rebuild results.

Advantageously, the amount of data returned to the lead node is significantly less than what it would be if the lead node were to compute the rebuild data entirely on its own. Bandwidth bottlenecks are greatly reduced or avoided, enabling rebuild to proceed much faster and without starving out other critical communications. The technique also benefits from parallel processing by different computing nodes.

Certain embodiments are directed to a method of generating rebuild data for a RAID (Redundant Array of Independent Disks) configuration having one or more failed drives. The method includes sending, by a lead node, a message to one or more other computing nodes coupled to the lead node over a network, each of said one or more other computing nodes coupled to a respective set of drives that are part of the RAID configuration, the message directing said one or more other computing nodes to generate partial rebuild results. The method further includes receiving the partial rebuild results by the lead node and generating complete rebuild data for rebuilding said one or more failed drives based at least in part on the partial rebuild results.

In some examples, the lead node is coupled to a set of drives that are part of the RAID configuration, and generating the complete rebuild data is further based on data from the set of drives coupled to the lead node.

In some examples, said one or more other computing nodes include multiple other computing nodes, and directing said one or more other computing nodes to generate partial rebuild results includes directing each of the other computing nodes to generate respective partial rebuild results based on the respective set of drives coupled thereto.

In some examples, said multiple other computing nodes are coupled to the lead node in a chain in which the lead node forms one end of the chain, and the method further includes at least one of the multiple other computing nodes in the chain consolidating its own partial rebuild results with partial rebuild results from at least one more-distal computing node in the chain to produce consolidated partial rebuild results, wherein receiving the partial rebuild results by the lead node includes receiving the consolidated partial rebuild results.

In some examples, sending the message by the lead node includes transmitting the message via an API (Application Program Interface) between the lead node and said one or more other computing nodes.

In some examples, the API is based on RDMA (Remote Direct Memory Access).

In some examples, sending the message includes providing a list of {drive, offset} pairs to said one or more other computing nodes, the list of {drive, offset} pairs identifying portions of drives that store data used in generating the partial rebuild results.

In some examples, sending the message further includes providing a buffer size, the buffer size specifying an amount of memory to be allocated for holding data used in generating the partial rebuild results.

In some examples, sending the message further includes providing a set of Galois field coefficients used in generating at least some of the partial rebuild results.

In accordance with some examples, the method further includes selecting the lead node as the node coupled to the most drives that belong to the RAID configuration of any node coupled to drives that belong to the RAID configuration.

Other embodiments are directed to a computerized apparatus constructed and arranged to perform a method of generating rebuild data for a RAID configuration, such as the method described above. Still other embodiments are directed to a computer program product. The computer program product stores instructions which, when executed on control circuitry of a computerized apparatus, cause the computerized apparatus to perform a method of generating rebuild data for a RAID configuration, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique generates rebuild data of a RAID configuration having one or more failed drives. The RAID configuration includes multiple sets of drives coupled to respective computing nodes, and the computing nodes are coupled together via a network. A lead node directs rebuild activities, communicating with the other node or nodes and directing such node(s) to compute partial rebuild results. The partial rebuild results are based on data of the drives of the RAID configuration coupled to the other node(s). The lead node receives the partial rebuild results over the network and computes complete rebuild data based at least in part on the partial rebuild results.

Figure 1:
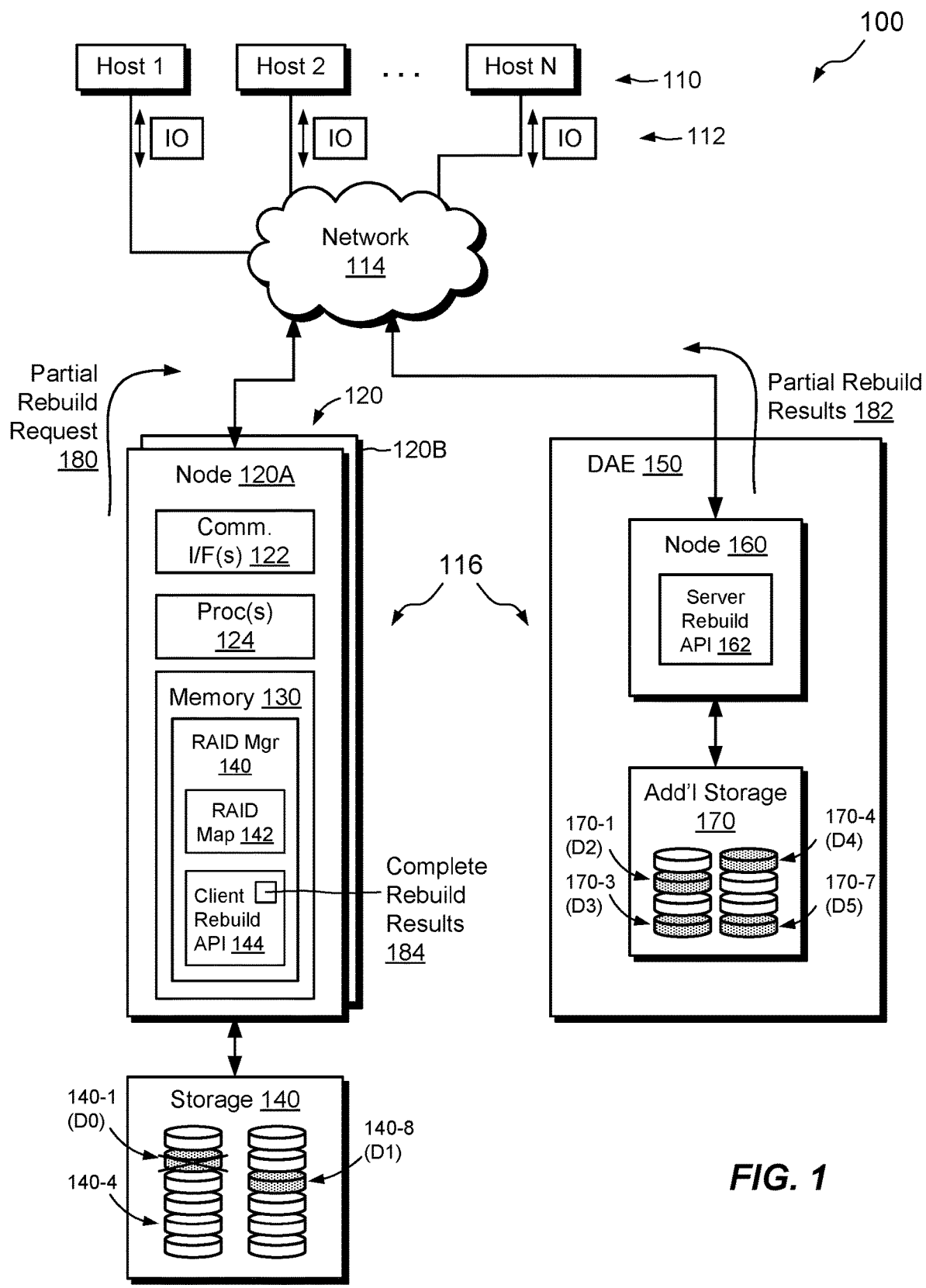
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes storage processing nodes 120A and 120B, which each attach to disk drives in storage 140, such as magnetic disk drives, electronic flash drives, and/or the like. In an example, nodes 120A and 120B are configured in an active-active arrangement, with storage 140 being shared between the two nodes. In some arrangements, nodes 120A and 120B are configured to run host applications themselves. In such cases, separate hosts 110 need not be present.

Nodes 120A and 120B (collectively 120) may be configured similarly, with each node including one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the nodes 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. Each node 120 is configured to receive I/O requests 112 according to block-based and/or file-based protocols and to respond to such I/O requests 112 by performing read and/or write operations.

To support additional disk storage, the depicted data storage system 116 further includes an expansion disk array enclosure (DAE) 150, which has its own storage node 160 coupled to additional storage 170 (e.g. magnetic disk drives, solid-state drives, etc.). As shown, the storage node 160 may include a server rebuild API 162. Although a single DAE 150 is shown, the data storage system 116 may include multiple DAEs, each having its own node and its own additional storage.

In an example, nodes 120 and storage 140 occupy one shelf of a chassis, and the DAE 150 occupies another shelf. Additional shelves may be provided for additional DAEs. Each shelf may have a backplane or midplane, which the respective nodes and associated drives plug into, and which provides power and allows for signal communications. Connections between or among shelves may be made using cables. One should appreciate, though, that no particular hardware configuration is required.

Nodes 120A and 120B may be connected together via the network 114 and/or via a high-speed bus, such as a PCIe (Peripheral Component Interconnect express) bus or some other high-speed bus or connection. Each of nodes 120 may connect to node 160 over network 114, e.g., via NVM Express (Non-Volatile Memory Host Controller Interface Specification) over fabric (NVMEoF), e.g., using Ethernet as a transport. Such an arrangement provides a bandwidth of approximately 5.5 GB/s (Gigabytes per second) per node. In an example, node 160 connects to the drives of additional storage 170 via a PCIe switch. The switch may employ PCIe Gen4 x32, which provides a bandwidth of approximately 48 GB/s. Thus, the bandwidth between node 160 and storage 170 is much higher in this example than the bandwidth between nodes 120 and storage 170. The depicted arrangement is shown merely as a realistic example, and it should not be construed as limiting.

As further shown in FIG. 1, the memory 130 of each of nodes 120 "includes," i.e., realizes by execution of software instructions, a RAID manager 140. The RAID manager 140 may include a RAID map 142 and a client rebuild API 144. The RAID manager 140 provides for RAID protection of disk storage, for example by arranging disk drives in storage 140 and/or 170 into RAID configurations. Each RAID configuration involves multiple participating disk drives, which provide capacity and redundancy and may be expressed as a single logical disk. In some examples, a RAID configuration is formed as a RAID group, i.e., a group of disk drives that are dedicated to the same logical disk. In other examples, a RAID configuration is formed as a mapped RAID, i.e., a typically larger number of disk drives which each contribute only a portion of their total storage space to the logical disk, and which may contribute different portions to different logical disks.

The terms "disk drive," "disk," and "drive" may be used herein interchangeably without any meaningful distinction intended. Also, disks, disk drives, and drives as used herein are not required to include any physical disk or disks, nor are they required to include any drive mechanism. Rather, the terms are used herein in their conventional manner to refer to persistent data storage devices of any kind, including those with or without physical disks and/or drives.

As part of the RAID manager 140, RAID map 142 associates RAID configurations with disks and/or disk portions that participate in RAID configurations. For example, RAID map 142 stores metadata associating disk drive identifiers and corresponding LBA ranges with particular RAID configurations and locations within such RAID configurations. For RAID groups, each participating disk drive is typically associated with a single RAID configuration. For mapped RAID, each disk drive may be associated with multiple RAID configurations.

Client rebuild API 144 supports communication with other nodes regarding rebuild activity, e.g., via a server rebuild API 162 on each of the other nodes. For performance reasons, communications between APIs 144 and 162 may be implemented using RDMA (Remote Direct Memory Access).

In addition to arranging disk resources into RAID configurations, the RAID manager 140 is also responsible for recovering from disk drive failures. For example, if a disk drive in a RAID configuration fails, the RAID manager performs the task of regenerating the data of the failed disk drive and writing such data to a spare drive, or, in the case of mapped RAID, to portions of multiple spare drives.

In prior schemes, the work of regenerating the data of a failed drive would fall entirely on the node that detected the failure, or on some other single node assigned this task. Such an approach would be highly inefficient in the FIG.-1 arrangement, however, where RAID configurations can span multiple enclosures. Consider, for example, a RAID configuration that includes local disks 140-1 and 140-8 in storage 140, as well as disks 170-1, 170-3, 170-4, and 170-7 in storage 170. To rebuild data of a failed disk, such as disk 140-1, node 120A would have to read voluminous data over the network 114 from each of drives 170-1, 170-3, 170-4, and 170-7. Such huge reads can consume all available bandwidth of network 114 and still be very slow.

We have recognized, however, that the work of rebuilding a failed drive need not be handled by one node alone. For example, we have observed that the computations required to rebuild a failed drive are separable, and that partial rebuild results can be generated separately and then combined to produce complete rebuild data. Referring now to disks 140-1, 140-8, 170-1, 170-3, 170-4, and 170-7 as D0-D5, respectively, and assuming single parity (e.g., RAID-4 or RAID-5), we can reconstruct failed drive D0 (140-1) as the bitwise XOR of D1+D2+D3+D4+D5 (where "+" designates XOR). Observing now that XOR operations have the associative property, meaning that D1+D2+D3+D4+D5 is the same as (D1)+(D2+D3+D4+D5), we can have node 120A provide D1 (e.g., as 140-8) and request that node 160 in DAE 150 compute partial rebuild results as (D2+D3+D4+D5). XOR has the property that the size of A+B is the same as the size of A, which is the same as the size of B. Thus, the size of (D2+D3+D4+D5) is the same as the size of any of them individually. Rather than sending all of D2, D3, D4, and D5 back to node 120A, all that is needed is to send the partial rebuild results as (D2+D3+D4+D5), which is one-quarter the size. Thus, the amount of data read over the network 114 is reduced to one-quarter what it would otherwise be. Although large amounts of data must still flow from affected disks of storage 170 to node 160, the high-speed connection between node 160 and of storage 170 allows for large data transfers with minimal impact.

When node 120A receives the partial rebuild results, RAID manager 140 XOR's them with D1 (140-8) to produce the complete rebuild data. Then RAID manager 140 places the complete rebuild data on a spare drive (e.g., 140-4), or on a spare portion of a drive, restoring the original redundancy of the RAID configuration.

One should appreciate that RAID configurations often include greater than 6 disks. Thus, the benefits of using partial rebuild results can far exceed those indicated above.

Similar benefits can be achieved in cases where double parity is involved. Double parity can entail more complex computations, e.g., calculations of Reed-Solomon parity using Galois field coefficients. In addition, the computations may vary depending on which disk or disks have failed (e.g., data, P parity, and/or Q parity). But generating complete rebuild data in double-parity schemes also involves sequences of XOR computations, where each term of a sequence is based on a respective disk. Computations in double-parity arrangements are thus similarly separable, such that partial rebuild results may be produced and combined in a similar manner.

Typical operation of a storage system 116 that embodies distributed RAID rebuild may proceed as follows. In the normal manner, hosts 110 issue I/O requests 112 to the data storage system 116. Nodes 120 receive the I/O requests 112 at the communication interfaces 122 and initiate further processing. Processing may involve issuing reads and writes to storage objects hosted by the storage system 116, such as LUNs (Logical UNits), file systems, virtual machine disks, and the like. Ultimately, such reads and writes to storage objects resolve to reads and writes to disk drives of storage 140 and/or 170, which are arranged in RAID configurations.

In the event of a failure of one or more disk drives, such as drive 140-1 in storage 140, RAID manager 140 initiates a rebuild operation. For example, RAID manager 140 checks the RAID map 142 to identify any RAID configurations that include drive 140-1 or any portion thereof. If the failed drive is part of a RAID group, the only affected RAID configuration is just that one RAID group. But in the case of mapped RAID, a resulting list of RAID configurations can number in the tens or hundreds, all of which will typically require repair.

The RAID manager 140 may then attempt to repair each affected RAID configuration. To repair a current RAID configuration, the RAID manager 140 may identify, from the RAID map 142, all disk drives and offset ranges thereof that participate in the current RAID configuration. The RAID manager 140 may then group together the identified disk drives according to the storage nodes to which they are most directly connected. For example, RAID manager 140 may arrange disks 140-1 and 140-8 in a first group connected to node 120A. It may also arrange disks 170-1, 170-3, 170-4, and 170-7 in a second group connected to node 160.

For each disk drive on any node other than node 120A (i.e., the "lead" node directing the rebuild activities), the client rebuild API 144 sends a message, e.g., a partial rebuild request 180, to the server rebuild API 162 on the other node (here, node 160). The partial rebuild request 180 directs the other node (160) to generate partial rebuild results. To this end, the partial rebuild request 180 includes a list of {drive, offset} pairs, where the "drive" identifies the specific disk drive that is part of the RAID configuration and the "offset" identifies an LBA range of that disk drive. In some examples, the partial rebuild request 180 also includes a buffer size. The buffer size specifies the size of a memory region to be allocated for holding the partial rebuild results. The list of {drive, offset} pairs and buffer size is sufficient to enable the node 160 to generate partial rebuild results for single-parity RAID configurations. For double-parity configurations that require computations involving Reed-Solomon parity, the partial rebuild request 180 may further include Galois field coefficients for each of the affected drives.

Once the other node 160 completes its computations, it returns the partial rebuild results 182 to the RAID manager 140 on node 120A, i.e., the lead node. The RAID manager 140 then combines (e.g., using bitwise XOR) the partial rebuild results 182 with the results based on disk 140-8. Data of disk 140-8 may be used directly for single-parity arrangements, or it may first be processed using the proper Galois field coefficient for double-parity arrangements (e.g., if Reed-Solomon parity is involved), with the result then being XOR'd with the partial rebuild results 182. In both cases, the computation at the lead node 120A produces complete rebuild results 184, which the RAID manager 140 may write out to a spare disk or to a spare portion of a disk, which may be identified in the RAID map.

Although the illustrated example uses only a single disk drive 140-1 of storage 140 in generating the complete rebuild results 184, other examples may include multiple drives of storage 140. In such cases, the rebuild manager may generate a separate partial rebuild result for the disks connected to lead node 120A, and then XOR this result with the partial rebuild results 182 received from node 160. Also, if there are multiple DAEs 150 that each house disk drives that belong to a RAID configuration being repaired, separate partial repair results may be generated for each additional DAE, with the results combined by lead node 120A.

Figure 2:
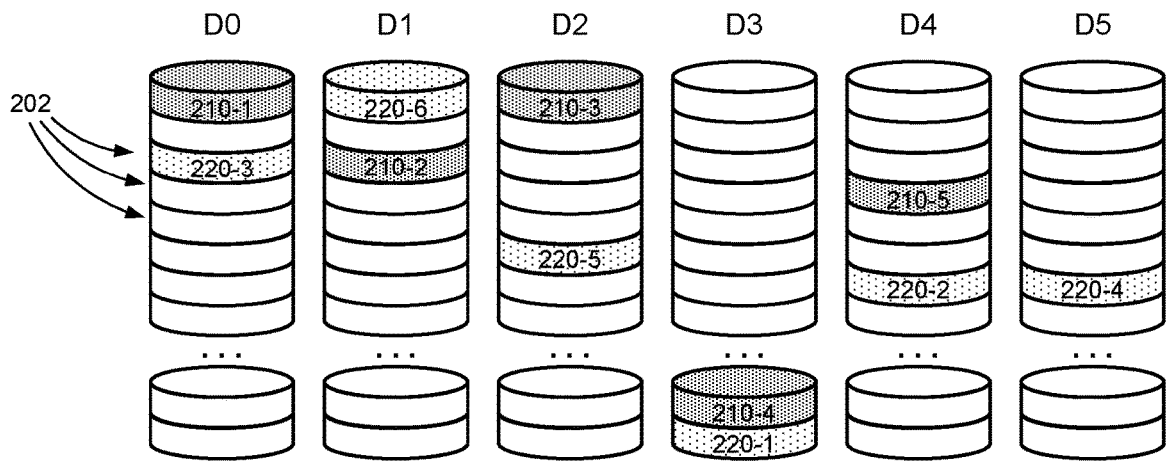
FIG. 2 is a block diagram of a portion of an example mapped RAID arrangement.

FIG. 2 shows an example arrangement of disk drives that may be used in a mapped RAID arrangement. Here, six disks D0 through D5 are shown for illustration, with the understanding that a typical mapped RAID arrangement includes many more than six disk drives. Each of disk drives D0-D5 may have a capacity of many terabytes and may be divided into regions 202, which may be 2 GB in size, for example. Other region sizes may be used. Each region 202 corresponds to an LBA range within a respective disk drive.

Regions 202 provide building blocks for constructing mapped RAID configurations. For example, a first mapped RAID configuration 210 may be formed from regions 210-1, 210-2, 210-3, 210-4, and 210-5, which are located on disks D0-D4, respectively. A second mapped RAID configuration may be formed from regions 220-1, 220-2, 220-3, 220-4, and 220-5, which are located on disks D3, D4, D0, D5, and D2, respectively. The regions in any mapped RAID configuration need not be in any particular order. Rather, RAID map 142 keeps track of the participating regions 202 in each RAID configuration and places them in logical order. Regions 202 of any one mapped RAID configuration are preferably the same size, but regions 202 of different mapped RAID configurations may have different sizes. In a storage system containing tens or hundreds of disk drives, which is not uncommon, the regions 202 that make up any mapped RAID configuration may be widely dispersed.

Recovery from a failed disk drive involves rebuilding the data of each portion 202 of the failed drive that belongs to a mapped RAID configuration. For example, recovering from a failure of disk D0 would require rebuilding data of region 210-1 of mapped RAID configuration 210 and rebuilding data of region 220-3 of mapped RAID configuration 220. However, recovering from a failure of disk D5 would require rebuilding only the data of region 220-4 of mapped RAID configuration 220 (assuming all other regions of D5 are empty). Although FIG. 2 shows an example of how mapped RAID configurations can be formed and managed, the depicted example is intended merely for illustration, as mapped RAID may be implemented in a variety of ways, the specifics of which are not critical to this disclosure.

Figure 3:
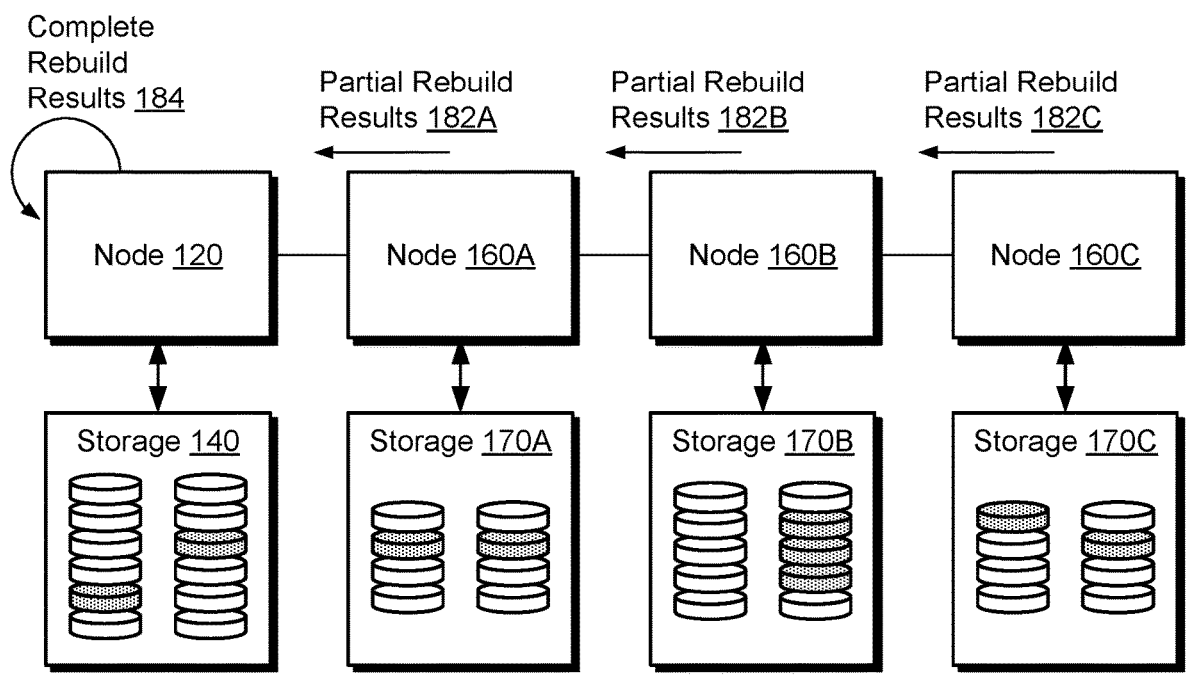
FIG. 3 is a block diagram of an example flow of partial rebuild results back to a lead node.

FIG. 3 shows an example of distributed RAID rebuild that involves multiple DAEs 150, with each having its own node (160A, 160B, or 160C) connected to respective storage (170A, 170B, or 170C). A node 120 is also present, along with its associated storage 140. RAID configurations may thus be formed from disk drives or regions of disk drives within any of the storage areas 140, 170A, 170B, and 170C.

According to some implementations, DAEs 150 are coupled sequentially to node 120 in a chain. For example, node 120 forms one end of the chain and connects to node 160A, which connects to node 160B, which connects to node 160C. To perform rebuild based on one or more drive failures, each node 160A, 160B, or 160C may compute its own partial rebuild results. For example, node 160A computes partial rebuild results 182A, node 160B computes partial rebuild results 182B, and node 160C computes partial rebuild results 182C. Lead node 120 then computes the complete rebuild results 184 based on the received partial rebuild results 182A, 182B, and 182C, along with results for any participating drives of storage 140.

In some examples, further efficiencies may be achieved by directing nodes to consolidate partial rebuild results along the chain en route back to the lead node 120. For example, node 160B may receive partial rebuild results 182C from node 160C and consolidate such results with its own partial rebuild results 182B, prior to sending the consolidated results back to node 160A. Owing to the size-conserving property of XOR, the consolidate results are the same size as the partial results 182C. Thus, the amount of data sent from node 160B to node 160A is reduced by half. Node 160A may likewise consolidate its own results 182A with the consolidated results received from node 160B. In this manner, the partial results sent back to node 120 are again the same size as the partial results 182C, with network demands being similarly reduced.

In some examples, node 120 may not be the best choice for the lead node that computes the complete rebuild results 184. For example, storage 140 may not contain any disk drives that participate in RAID configurations needing repair. In this case, some other node may be selected as the lead node. In an example, the lead node is selected as the node having the greatest number of participating disk drives in its associated storage 170. Network topology may also be considered. The selected lead node then receives partial rebuild results from other nodes and computes the complete rebuild results 184.

Particular rebuild scenarios will now be described in greater detail. These include scenarios involving a single failed drive (e.g., for RAID-4 or RAID-5) and those involving two drive failures (e.g., RAID-6). For simplicity of presentation, the following scenarios assume that node 120A is the lead node and that there is only one expansion DAE 150. However, these scenarios can easily be extended to cases where other nodes are the lead node and/or greater than one expansion DAE 150 is provided. The following examples are illustrative of suitable rebuild procedures but are not intended to be limiting.

A) Recovery of P and Q Drive Failures

Recovery of P parity column: The lead node 120A will identify which drives in the current RAID configuration are located on the expansion DAE 150. The recovery method will then be split to the following steps:
1) Offload the XOR calculation of the data that resides on expansion DAE 150. The lead node 120A sends a partial rebuild request 180 to the expansion DAE 150, providing the required information:
   a) The list of {drive, offset} pairs, as well as the buffer size.
   b) A destination location to store the calculation result.
2) The expansion DAE 150 receives the request 180, reads the relevant data, and calculates the XOR of that data. When the calculation is complete and the result has been written to the requested destination location, the expansion DAE 150 will send a reply that indicates completion of the request 180.
3) In parallel with the expansion node calculation (or at any suitable time), the lead node 120A calculates the XOR of the (remaining) data that reside locally in storage 140.
4) After both calculations are complete, the lead node 120A calculates the XOR of the results to reconstruct the P parity column.

Recovery of Q parity column: The recovery of Q (Reed-Solomon) parity column is similar to that of the P parity column with the following changes:
1) The recovery calculation uses Galois Field (GF) operations.
2) The lead node 120A also includes in the request 180 to the expansion DAE 150 the GF coefficients array corresponding to the drives that involve in the recovery calculation.

For example, consider a RAID 8+2 (8 data plus 2 parity) topology where drives $D_0$-$D_3$ are located in storage 140 and drives $D_4$-$D_7$ are located in storage 170. The recovery of the Q parity then involves computation of the following expression, for each row:

$$Q = g_0xD_0 + g_1xD_1 + g_2xD_2 + g_3xD_3 + g_4xD_4 + g_5xD_6 + g_6xD_6 + g_7xD_7.$$

Note that there is a respective coefficient for each of the drives. A first part of the computation ($g_0xD_0 + g_1xD_1 + g_2xD_2 + g_3xD_3$) is calculated by the lead node 120A, and a second part ($g_4xD_4 + g_5xD_5 + g_6xD_6 + g_7xD_7$) is offloaded and calculated by the expansion DAE 150, i.e., by node 160. In addition to providing the list of {drive, offset} pairs and the buffer size in request 180, the lead node 120A will also include the specific $g_i$ GF coefficients for each of the drives $D_4$, $D_5$, $D_6$, and $D_7$.

B) Recovery of Q and Data Drive Failures

First, the data drive will be recovered using the existing P column. The recovery method will be similar to the recovery of P parity as described in section (A), by splitting the XOR calculation between the lead node 120A and the expansion DAE 150.

The Q column will be calculated using the recovered Data and the other healthy drives, as described in the recovery of the Q column in section (A).

C) Recovery of P and Data Drive Failures

The Data column will be recovered using the Q column:
1) First, data Q' is calculated, which is a GF calculation of all the participating drives, excluding the P drive and the failed drive. Assuming drive $D_4$ failed, then:

$$Q' = g0xD0 + g1xD1 + g2xD2 + g3xD3 + g5xD5 + g6xD6 + g7xD7$$

2) The lead node 120A offloads the calculation that involves the drives on the expansion DAE 150, as described in the recovery method for the Q column in section (A).
3) The lead node 120A then recovers the data with the following calculation (assuming drive D4 is the failed drive):

$$D4 = g4^{(-1)}x(Q+Q').$$

The P column is recovered using the same method described for recovering the P column in section (A).

D) Recovery of Two Data Drives Failure (Data1, Data2)

This case requires the most complex recovery procedure. The lead node 120A orchestrates a distributed calculation of P', which is the XOR of all the drives in the RAID configuration, excluding the failed drives and the Q drive. Part of the calculation that involves the drives on the expansion DAE 150 are offloaded to node 160, with a similar request 180 as described in section (A).

The lead node 120A orchestrates a distributed calculation of Q', which is the GF calculation of all the drives, excluding the failed drives and the P drive. Part of the calculation that involves the drives on the expansion DAE 150 will be offloaded, with a similar request 180 as described in section (A).

After P' and Q' are calculated, the lead node 120A recovers Data1 column using P, P', Q, Q' and GF coefficients, e.g., as follows:

$$Data1=(g1+g2)^{(-1)}x[(g2x(P+P'))+(Q+Q')].$$

The lead node 120A then recovers Data2 by performing an XOR of P, P' and the recovered Data1, e.g., as follows:

$$Data2=P+P'+Data1.$$

The recovery methods (A)-(D) described above include all possible cases of two-drive failures. The recovery of a single drive failure will be performed in a similar way. For example, a failed data drive is recovered using the P parity XOR calculation, with offload to the expansion DAE. A failed P drive is recovered with an XOR calculation of the data drives, and a failed Q drive (for double-parity situations) is recovered using the same calculation described in section (A).

Figure 4:
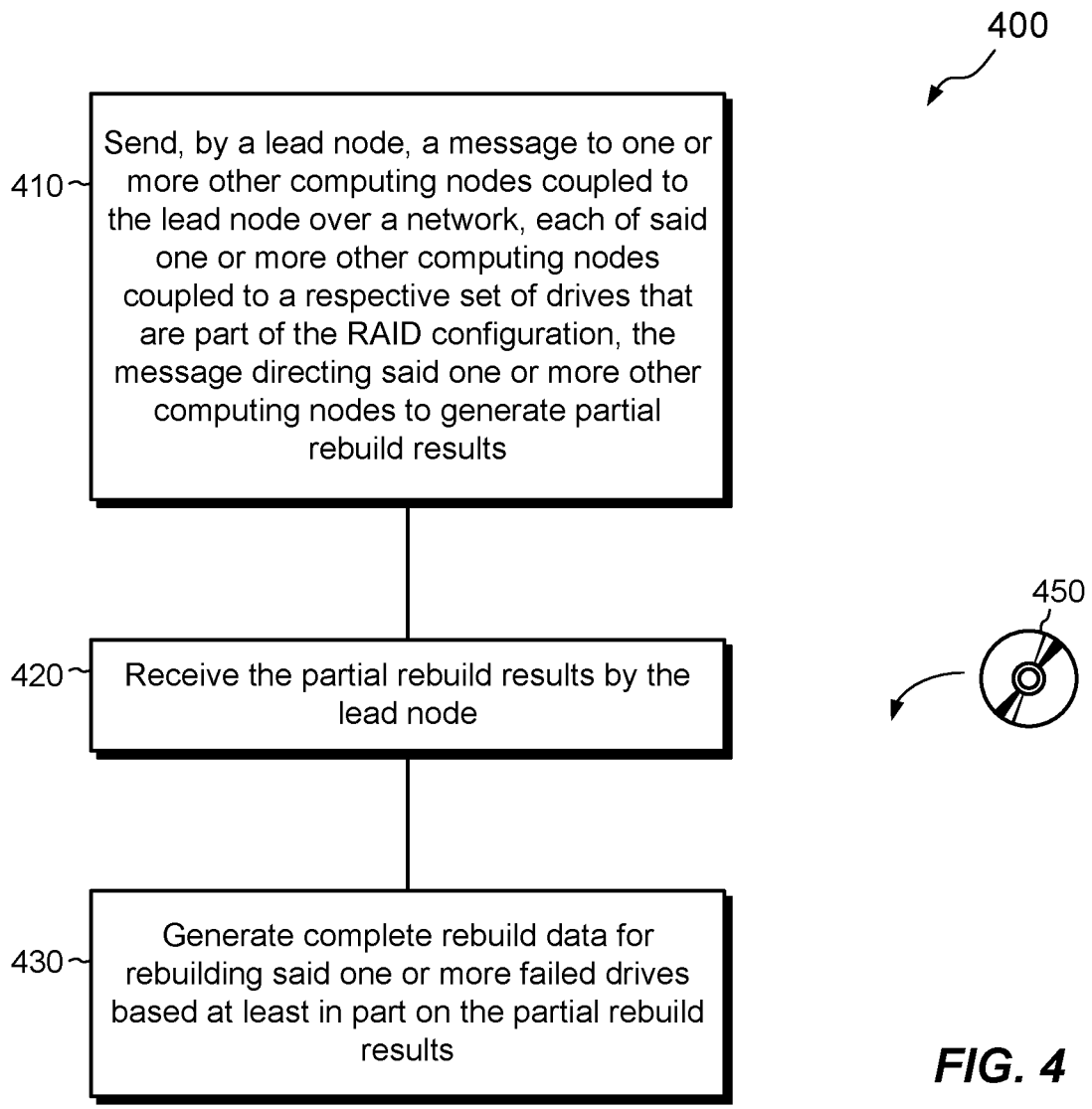
FIG. 4 is a flowchart showing an example method of generating rebuild data for a RAID configuration having one or more failed disks.

FIG. 4 shows an example method 400 that may be carried out in connection with the environment 100 and provides a review of some of the topics described above. The method 400 is typically performed, for example, by the software constructs described in connection with FIG. 1, which reside in the memory 130 of node 120A and are run by the set of processors 124. The various acts of method 600 may be ordered in any suitable way. Accordingly, embodiments may be constructed in which acts are performed in orders different from that illustrated, which may include performing some acts simultaneously.

At 610, the lead node (e.g., node 120A) sends a message 180 to one or more other computing nodes (e.g., node 160) coupled to the lead node over a network 114. Each of said one or more other computing nodes (160) is coupled to a respective set of drives 170 that are part of the RAID configuration. The message 180 directs said one or more other computing nodes 160 to generate partial rebuild results 182.

At 620, the lead node 120A receives the partial rebuild results 182, e.g., from the node 160 in DAE 150.

At 630, complete rebuild data 184 is generated for rebuilding said one or more failed drives based at least in part on the partial rebuild results 182.

An improved technique has been described for generating rebuild data of a RAID configuration (e.g., a RAID group or mapped RAID) having one or more failed drives. The RAID configuration includes multiple sets of drives coupled to respective computing nodes, such as nodes 120A and 160, and the computing nodes are coupled together via a network 114. A lead node, such as node 120A, directs rebuild activities, communicating with the other node 160 or multiple such nodes, if provided, and directing such node(s) to compute partial rebuild results 182. The partial rebuild results 182 are based on data (including any parity data) of the drives of the RAID configuration coupled to the other node(s). The lead node receives the partial rebuild results 182 over the network and computes complete rebuild data 184 based at least in part on the partial rebuild results 182.

Having described certain embodiments, numerous alternative embodiments or variations can be made. For example, recovery operations have been described in connection with RAID-4, RAID-5, and RAID-6 configurations, but the principles described herein are not limited to such arrangements. For instance, embodiments may further include cases involving combinations of mirroring with parity, as well as those involving parity of other forms besides those described.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of generating rebuild data for a RAID (Redundant Array of Independent Disks) configuration having one or more failed drives, comprising:

sending, by a lead node, a message to one or more other computing nodes coupled to the lead node over a network, each of said one or more other computing nodes coupled to a respective set of drives that are part of the RAID configuration, the message directing said one or more other computing nodes to generate partial rebuild results, wherein the lead node is selected as the node coupled to the most drives that belong to the RAID configuration of any node coupled to drives that belong to the RAID configuration;

receiving the partial rebuild results by the lead node; and generating complete rebuild data for rebuilding said one or more failed drives based at least in part on the partial rebuild results.

2. The method of claim 1, wherein the lead node is coupled to a set of drives that are part of the RAID configuration, and wherein generating the complete rebuild data is further based on data from the set of drives coupled to the lead node.

3. The method of claim 1, wherein said one or more other computing nodes include multiple other computing nodes, and wherein directing said one or more other computing nodes to generate partial rebuild results includes directing each of the other computing nodes to generate respective partial rebuild results based on the respective set of drives coupled thereto.

4. The method of claim 3, wherein said multiple other computing nodes are coupled to the lead node in a chain in which the lead node forms one end of the chain, and wherein the method further comprises:

at least one of the multiple other computing nodes in the chain consolidating its own partial rebuild results with partial rebuild results from at least one more-distal computing node in the chain to produce consolidated partial rebuild results, wherein receiving the partial rebuild results by the lead node includes receiving the consolidated partial rebuild results.

5. The method of claim 1, wherein sending the message by the lead node includes transmitting the message via an API (Application Program Interface) between the lead node and said one or more other computing nodes.

6. The method of claim 5, wherein the API is based on RDMA (Remote Direct Memory Access).

7. The method of claim 5, wherein sending the message includes providing a list of {drive, offset} pairs to said one or more other computing nodes, the list of {drive, offset} pairs identifying portions of drives that store data used in generating the partial rebuild results.

8. The method of claim 7, wherein sending the message further includes providing a buffer size, the buffer size specifying an amount of memory to be allocated for holding data used in generating the partial rebuild results.

9. The method of claim 7, wherein sending the message further includes providing a set of Galois field coefficients used in generating at least some of the partial rebuild results.

10. The method of claim 1, wherein the partial rebuild results received from at least one of said one or more other computing nodes include results calculated from at least two drives.

11. A computerized apparatus, comprising control circuitry that includes a set of processing units coupled to memory, the control circuitry constructed and arranged to:

send, by a lead node via an API (Application Program Interface), a message to one or more other computing nodes coupled to the lead node over a network, each of said one or more other computing nodes coupled to a respective set of drives that are part of the RAID (Redundant Array of Independent Disks) configuration, the message directing said one or more other computing nodes to generate partial rebuild results;

receive the partial rebuild results by the lead node; and generate complete rebuild data for rebuilding said one or more failed drives based at least in part on the partial rebuild results, wherein the control circuitry constructed and arranged to send the message is further constructed and arranged to provide a list of {drive, offset} pairs to said one or more other computing nodes, the list of {drive, offset} pairs identifying portions of drives that store data used in generating the partial rebuild results.

12. The computerized apparatus of claim 11, wherein the lead node is coupled to a set of drives that are part of the RAID configuration, and wherein the control circuitry constructed and arranged to generate the complete rebuild data is further constructed and arranged to generate the complete rebuild data based on data from the set of drives coupled to the lead node.

13. A computer program product including a set of non-transitory, computer-readable media having instructions which, when executed by control circuitry of a computerized apparatus, cause the computerized apparatus to perform a method of generating rebuild data for a RAID (Redundant Array of Independent Disks) configuration having one or more failed drives, the method comprising:

sending, by a lead node, a message to multiple other computing nodes coupled to the lead node over a network, each of said other computing nodes coupled to a respective set of drives that are part of the RAID configuration, the message directing said other computing nodes to generate partial rebuild results based on the respective sets of drives coupled thereto;

receiving the partial rebuild results by the lead node; and generating complete rebuild data for rebuilding said one or more failed drives based at least in part on the partial rebuild results, wherein said multiple other computing nodes are coupled to the lead node in a chain in which the lead node forms one end of the chain, wherein the method further comprises at least one of the multiple other computing nodes in the chain consolidating its own partial rebuild results with partial rebuild results from at least one more-distal computing node in the chain to produce consolidated partial rebuild results, and wherein receiving the partial rebuild results by the lead node includes receiving the consolidated partial rebuild results.

14. The computer program product of claim 13, wherein the lead node is coupled to a set of drives that are part of the RAID configuration, and wherein generating the complete rebuild data is further based on data from the set of drives coupled to the lead node.

15. The computer program product of claim 13, wherein sending the message by the lead node includes transmitting the message via an API (Application Program Interface) between the lead node and said one or more other computing nodes, wherein the API is based on RDMA (Remote Direct Memory Access).

16. The computer program product of claim 15, wherein sending the message includes providing a list of {drive, offset} pairs to said one or more other computing nodes, the list of {drive, offset} pairs identifying portions of drives that store data used in generating the partial rebuild results.

17. The computer program product of claim 16, wherein sending the message further includes providing a set of Galois field coefficients used in generating at least some of the partial rebuild results.

18. The computer program product of claim 13, further comprising the selecting the lead node as the node coupled to the most drives that belong to the RAID configuration of any node coupled to drives that belong to the RAID configuration.

* * * * *